(12) United States Patent
Drews

(10) Patent No.: US 7,111,570 B1
(45) Date of Patent: Sep. 26, 2006

(54) DYNAMIC SURFACE ELEMENT FOR BODIES MOVING THROUGH A FLUID

(76) Inventor: Hilbert F. P. Drews, 5640 S. 76th St., Greendale, WI (US) 53129

( * ) Notice: Subject to any disclaimer, the term of this patent is extended or adjusted under 35 U.S.C. 154(b) by 0 days.

(21) Appl. No.: 11/324,605

(22) Filed: Jan. 3, 2006

(51) Int. Cl.
*B63B 1/34* (2006.01)
(52) U.S. Cl. .................................... 114/67 R
(58) Field of Classification Search .............. 114/67 R, 114/67 A
See application file for complete search history.

(56) References Cited

U.S. PATENT DOCUMENTS

| | | | | |
|---|---|---|---|---|
| 2,642,239 A | * | 6/1953 | Crossley | 244/105 |
| 2,800,291 A | * | 7/1957 | Stephens | 244/200 |
| 3,690,283 A | * | 9/1972 | Pool et al. | 114/67 A |
| 4,284,302 A | * | 8/1981 | Drews | 296/181.5 |
| 5,988,568 A | * | 11/1999 | Drews | 244/200 |

FOREIGN PATENT DOCUMENTS

GB         2069953    *  9/1981

* cited by examiner

*Primary Examiner*—Stephen Avila
(74) *Attorney, Agent, or Firm*—Andrus, Sceales, Starke & Sawall, LLP

(57) ABSTRACT

A dynamic surface element is located on a substantially smooth surface of a body moving through a fluid for improving the movement of the body. The dynamic surface element includes a lower wall provided on the surface of the body, the lower wall having a front edge extending rearwardly to a back edge. An upper wall rises upwardly and rearwardly from the lower wall with the upper wall having a lower edge connected to the lower wall, and an upper edge spaced above the lower wall. A pair of sidewalls connects the upper and lower walls and together with the upper and lower walls forms a chamber accumulating internal pressure offset by external pressure caused by fluid flow against and over the upper wall as the body moves. The dynamic surface element interrupts layers of fluid normally accumulating on the smooth surface of the body moving through the fluid and creating drag. A major portion of the fluid flowing over and rearwardly of the upper wall is reversed and captured due to internal and external pressure differential in the chamber to reduce drag, and simultaneously act against rear surfaces of the dynamic surface element to define a propulsive force assisting movement of the body.

6 Claims, 4 Drawing Sheets

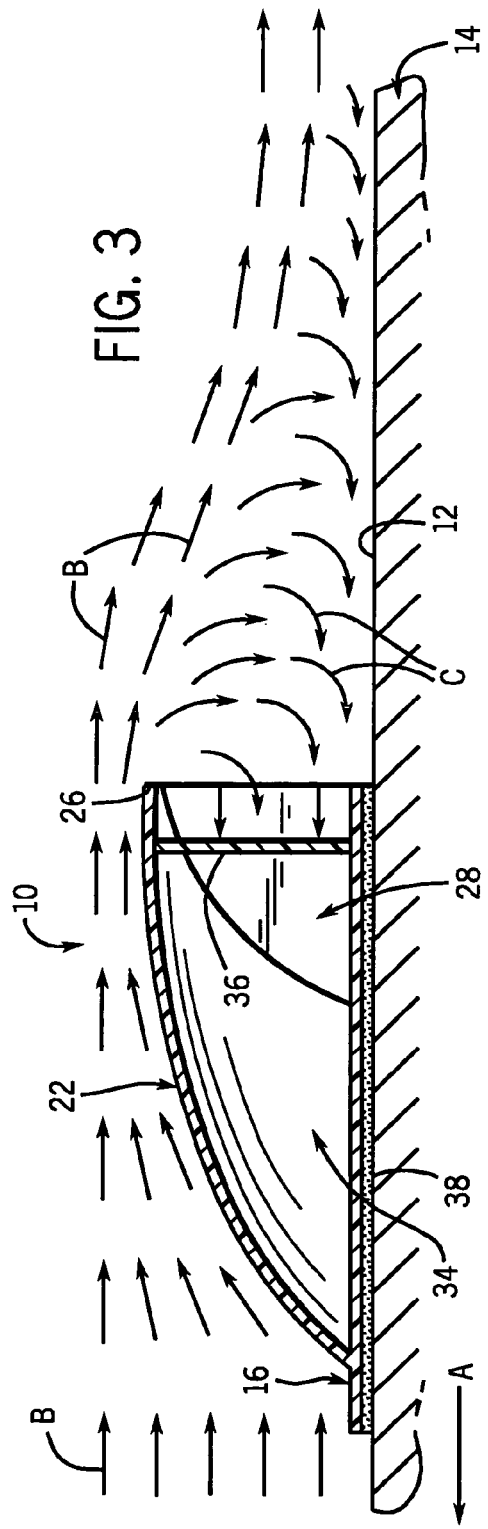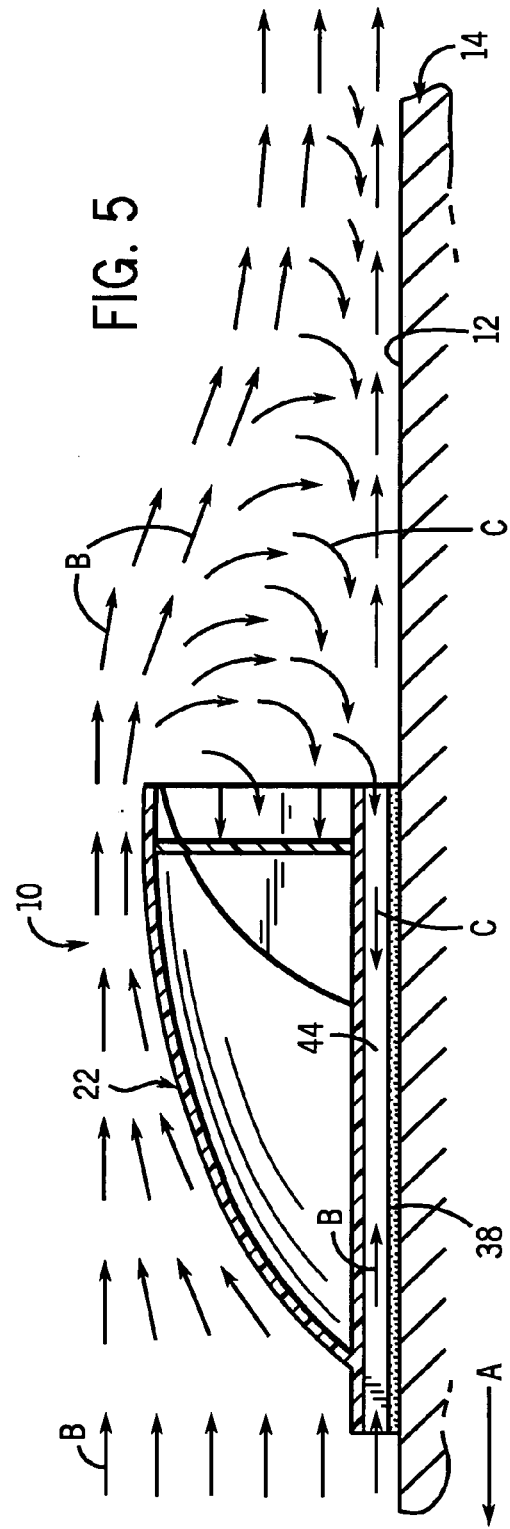

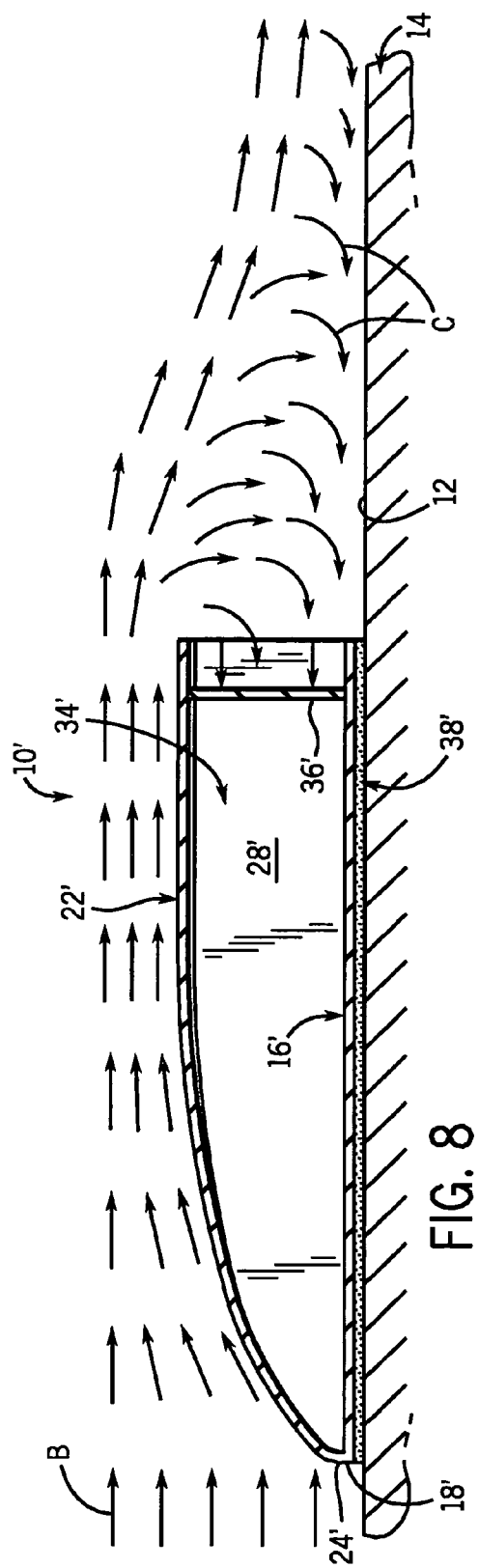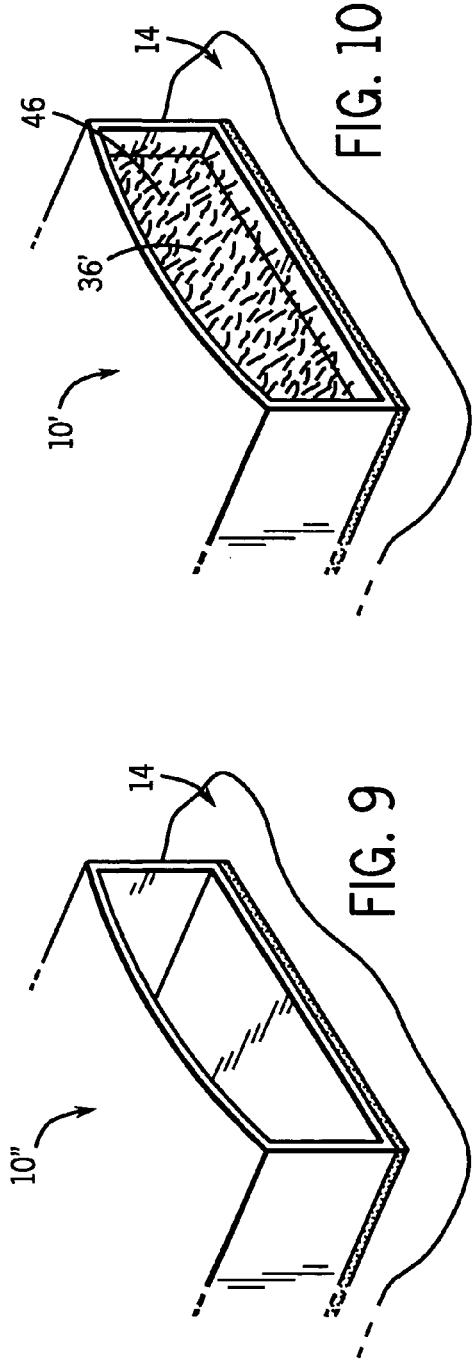

DYNAMIC SURFACE ELEMENT FOR BODIES MOVING THROUGH A FLUID

FIELD OF THE INVENTION

This invention relates broadly to a surface attachment to or modification of a body for improving the movement of the body in a fluid medium.

BACKGROUND OF THE INVENTION

Prior U.S. patents and other literature disclose utilization of various surface configurations for reducing of the drag and/or creating of various forces on the surface of a moving body such as an automobile, boat, airplane or other devices having a surface which moves through air, water or other fluids.

The present inventor's U.S. Pat. No. 4,284,302 (issued Aug. 18, 1981) and U.S. Pat. No. 5,988,568 (issued Nov. 23, 1999) disclose surface modifications to a body to improve the efficient movement through a fluid. Both patents disclose air directing flutes which are laterally and longitudinally spaced and distributed over a surface to improve the efficiency of movement in fluid mediums.

As noted in those patents and others, there is a continuing demand for practical constructions which will more fully promote the efficient movement of vehicles and other bodies in air, water and other fluid mediums. The current energy crisis has created the need and desire for more effective surface constructions for various bodies which move through various mediums with an increased efficiency. Many of the prior art attempts to enhance body movement through a fluid medium have required the use of various combinations or multiple formations of surface constructions.

Consider the various forces acting on a smooth surface of the body moving through a fluid medium. In the case of a land-based vehicle in a static condition, a single or primary layer adheres non-releasably to the surface in a manner known as adhesion. As the vehicle moves in a dynamic condition, the first layer of air pulls or drags along a second layer of air. This second layer pulls along a third layer and subsequent layers of air along the entire lengthwise surface of the moving body forming a phenomenon as cohesion. As a result of the normal movement of the body, myriads of additional layers of air (or other fluid medium) are pulled along creating drag. Without remedial structure to counter this fluid accumulation, drag will increase at a geometrically compounding rate creating an undesirable wake. These fluid layers that build up on the smooth surface of the body require additional energy to move the surface through the media offsetting much of the hoped for economies from the various flow patterns. In practical terms, such additional energy translates to greater fuel demands in a continually worsening energy situation in which fuel supply is lacking and costs are increasingly rising.

It is therefore desirable to provide dynamic surface structure on a body moving through a fluid medium in a manner which will substantially interrupt the adhesive and cohesive accumulation of the medium which causes adverse fluid flow and drag. It is likewise desirable to convert the adverse fluid flow to a more favorable propulsive force which pushes the body forward. It is further desirable to provide an independent dynamic surface attachment which will improve movement of a body through a fluid medium by itself.

SUMMARY OF THE INVENTION

It is a general object of the present invention to provide a body moving through a fluid medium with drag-reducing structure that will promote a more efficient movement of the body.

It is one object of the present invention to provide dynamic surface attachments or modifications to a body moving through a fluid medium in a manner which will prevent adverse fluid flow and lessen drag.

It is another object of the present invention to minimize the wake that currently develops over smooth surfaces of a body moving through a fluid medium.

It is also an object of the present invention to convert a portion of adverse fluid flow on the smooth surface of a moving body into a reverse flow which is captured and directed forwardly so as to provide a propulsive force urging the body forward.

It is a further object of the present invention to provide dynamic surface units on a smooth surface of a body moving through a fluid medium which, when properly oriented and located, may enhance the lift of the body, or create a downward force on the body.

It is an additional object of the present invention to supplement a body with a singular corrective unit which will result in enhanced fuel efficiency and increased velocity when driving the body through a fluid medium.

The invention relates to a dynamic surface element located on a substantially smooth surface of a body moving through a fluid for improving the movement of the body. The dynamic surface element includes a lower wall positioned on the surface of the body. The lower wall has a front edge extending rearwardly to a back edge. An upper wall rises upwardly and rearwardly from the lower wall. The upper wall has a lower edge connected to the lower wall, and an upper edge raised above the lower wall. A pair of side walls connect the upper and lower walls, and form with the upper and lower walls, a chamber accumulating internal pressure offset by external pressure caused by fluid flow against and over the upper wall as the body moves. The dynamic surface element interrupts layers of fluid normally accumulating on the smooth surface of the body moving through the fluid and creating drag. A major portion of the fluid flowing over and rearwardly of the upper wall is reversed and captured due to the internal and external pressure differential of the chamber to reduce drag, and acts simultaneously against rear surfaces of the dynamic surface element to define a propulsive force assisting movement of the body.

The dynamic surface element may include elevating structure for raising the lower wall above the surface of the body. The dynamic surface may also include an inner wall extending between the upper wall and the lower wall. The inner wall provides a reaction surface against which the reverse fluid flow acts, and forms a barrier for preventing excess water and dirt from accumulating in the chamber. The lower wall is preferably attached to the body by a peel-and-stick adhesive. The dynamic surface element has upper walls which proceed upwardly and rearwardly at various slopes. In one alternative embodiment, the inner wall is optionally provided with post pressurizing material on a rear surface thereof.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a longitudinal sectional view of FIG. 1 taken on line 3—3 showing fluid flowing relative to the dynamic surface element mounted on the body;

FIG. 5 is a view similar to FIG. 3 for the embodiment shown in FIG. 4;

FIG. 8 is a longitudinal sectional view taken on line 8—8 of FIG. 6 showing fluid flowing relative to the dynamic surface element mounted on the body;

FIG. 9 is a fragmentary view similar to FIG. 6 but without the inner wall; and

FIG. 10 is a fragmentary view of FIG. 6 but showing a post pressurizing material attached to the inner wall.

DETAILED DESCRIPTION OF THE INVENTION

Figure 1:
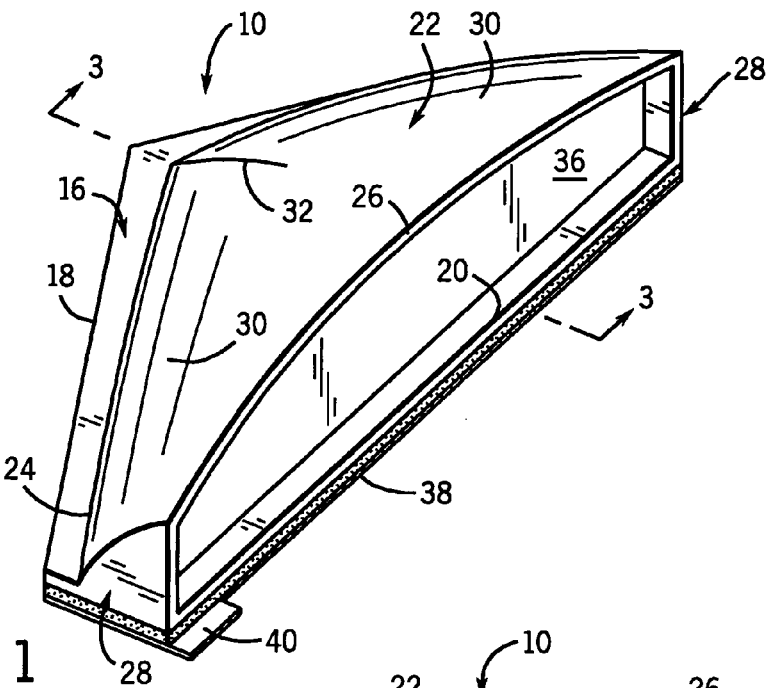
FIG. 1 is a rear perspective view of one type of dynamic surface element having an inner wall.

Throughout the application, the illustrations demonstrate the essence of the invention, but do not restrict the various other shapes and sizes of other dynamic surface elements used in practice that fall within the purview of the invention.

Referring now to the drawings, FIGS. 1–5 show a preferred embodiment of a dynamic surface element 10 for attaching to and/or modifying a substantially smooth surface 12 of a body 14 moving through a fluid medium, such as air, another gas or water. It is the express purpose of the dynamic surface element 10 to provide a fluid responsive and drag-reducing structure which will promote a more efficient movement of the body 14 through the fluid medium. Unlike prior art dynamic surface structures which generally must be used in various combinations, the dynamic surface element 10 of the present invention 10 is designed as a corrective unit which will enhance movement of the body 14 through a fluid medium when used by itself on the body, as well as when used with other similar dynamic surface elements embodying the same basic structural makeup. The dynamic surface element 10 may be constructed of various materials but typically is fabricated from an economical, lightweight and durable material such as fiberglass or plastic.

Figure 2:
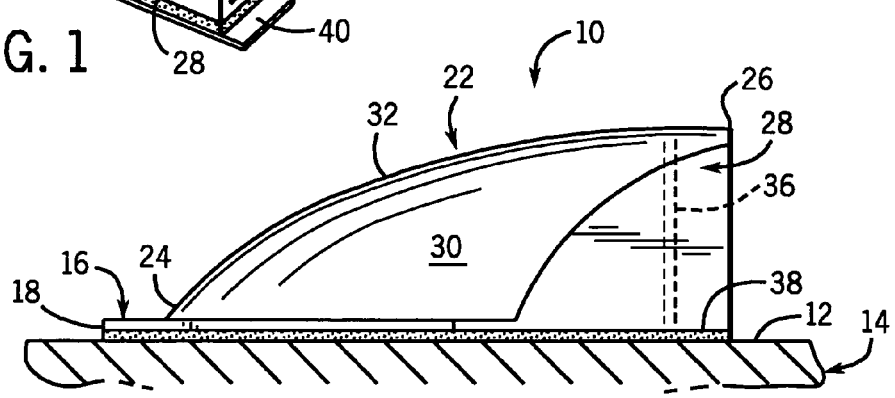
FIG. 2 is a side view of the dynamic surface element in FIG. 1 mounted on the surface of a body.

The dynamic surface element 10 represented in FIGS. 1–3 includes a lower, generally planar wall 16 having a front edge 18 extending rearwardly towards a back edge 20. An upper wall 22 rises upwardly and rearwardly from the lower wall 16, and has a lower edge 24 connected to the lower wall 16, and an upper edge 26 spaced above the lower wall 16. In the preferred embodiment, the lower edge 24 of the upper wall 22 is shown spaced slightly rearwardly of the front edge 18 of lower wall 16, and the upper edge 26 of the upper wall 22 lies generally aligned with the back edge 20 of the lower wall 16. It should be appreciated however, that such design is not restrictive but simply exemplary, and that the lower and upper edges 24, 26, respectively, could have various other locations relative to the lower wall 16 as desired. Also, in the preferred embodiment, the upper wall 22 continuously curves sharpedly upwardly and then proceeds gradually rearwardly from its lower edge 24 to its upper edge 26 for a purpose to be set forth below.

A pair of sidewalls 28 connects the lower wall 16 and the upper wall 22. As seen best in FIG. 1, the upper wall 22 may have laterally curving portions 30 which run between a crest 32 and the top of each sidewall 28. Together with the lower and upper walls 16, 22, respectively, the sidewalls 28 form an internal chamber 34 (FIG. 3). In the broadest aspect of the invention, the chamber 34 is open from the rear (as depicted in FIG. 9). However, an inner wall 36 may extend between the lower wall 16 and the upper wall 22. The inner wall 36 is preferably configured as a planar vertical structure, but could be curved or otherwise constructed. The inner wall 36 adds structural stability to the element 10, but also serves two other important functions which will be appreciated in the application of element 10 to follow.

The element 10 can be attached to the body 14 in different ways. One preferred attachment device is a convenient peel-and-stick adhesive 38 which is provided on the bottom of the lower wall 16. The adhesive 38 carries a protective, disposable release liner 40 that can be easily peeled away when attachment of the element 10 to the body 14 is desired. The element 10 can also be constructed integral with the body 14, if desired, and may be otherwise provided or located on surface 12 of body 14.

In use, the dynamic surface element 10 is preferably attached by the adhesive 38 in a desired location on the smooth surface 12 of the body 14 moving through a fluid medium when it is desired to remedy the fluid layer buildup and drag problem discussed in the Background of the Invention, and enhance the movement of the body 14. In the example shown, the body 14 may be an external surface of a vehicle, such as an automobile or truck, moving in a direction A and encountering fluid flow (air) represented by arrows B.

Modification of the body 14 with the placement of dynamic surface element 10 interrupts the layers of air normally accumulating on the surface 12 as the body 14 moves through and against the air. As seen in FIG. 3, air is initially directed upwardly and rearwardly over the upper wall 22 with external pressure created from the impact against the upper wall 22 offsetting internal pressure created in the chamber 34. A major portion of the air B flowing over the upper edge 26 will be converted and reversed (as shown by arrows C) due to negative pressure or suction created at the rear of the element 10. Such suction is caused by the pressure differential between the external and internal pressures that are present during the airflow.

In the broadest aspect of the invention, the reverse flow C is effectively captured behind the element 10 and will act upon the rear edges of the lower wall 16, the upper wall 22 and the sidewalls 28 if no inner wall 36 was present. The captured reverse flow C not only prevents the persistent fluid layer buildup that creates drag, but also simultaneously creates a propulsive force which promotes pushing the body 14 forward in the direction A. With the inclusion of inner wall 36, further favorable movement of the body 14 is attained. This is due to the fact that the inner wall 36 defines a reaction surface increasing the area against which the captured reverse flow may act. The inner wall 36 also functions as a barrier to prevent water, snow and dirt or other foreign matter from accumulating inside chamber 34. In certain situations, it may be desirable to modify the shape of the inner wall 36 so as to minimize the capture of water and dirt.

Figure 4:
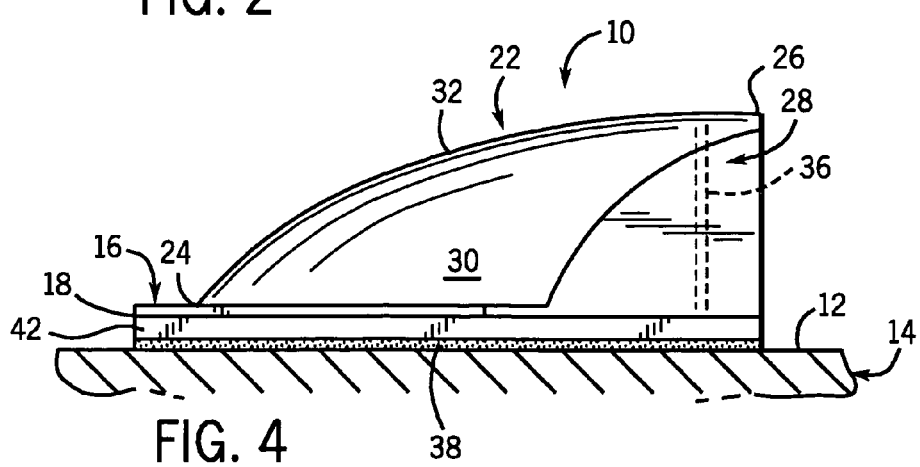
FIG. 4 is a view like FIG. 2 showing an elevating strip for raising the dynamic surface element above the body.
Figure 6:
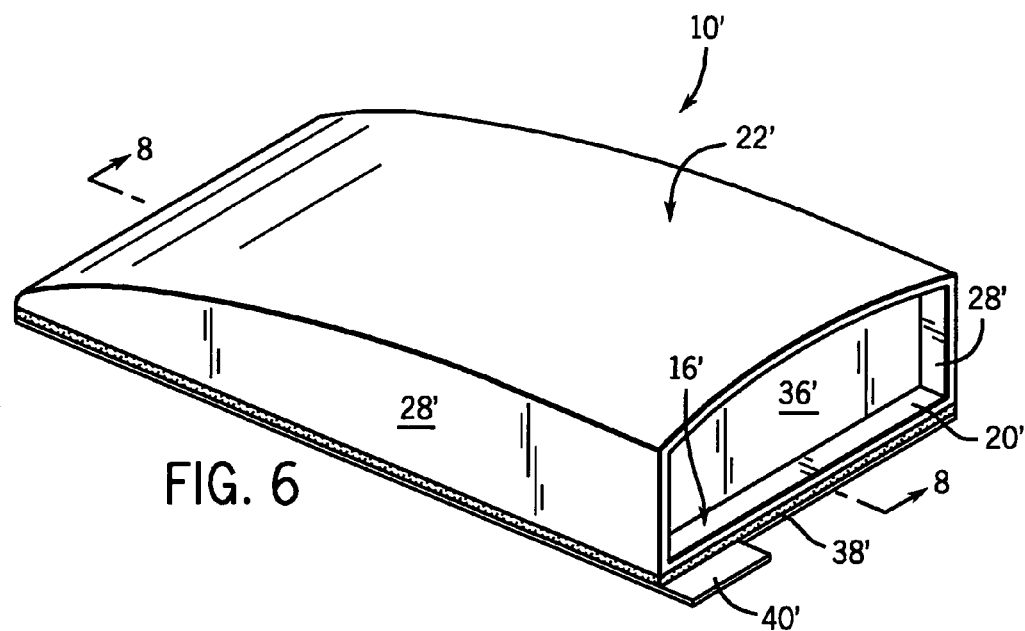
FIG. 6 is a rear perspective view of another type of dynamic surface element.
Figure 7:
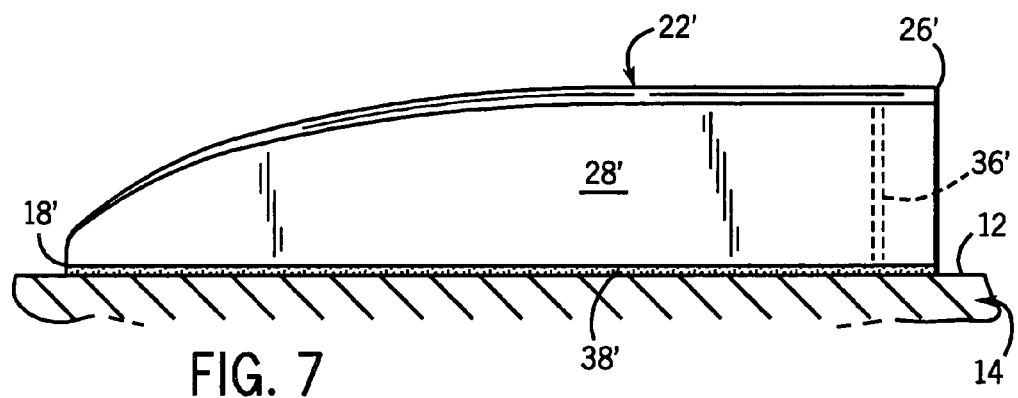
FIG. 7 is a side view of the dynamic surface element in FIG. 6 mounted on the surface of a body.

For optimal operation and/or mounting convenience, the dynamic element 10 may be held in a position raised above the surface 12 of body 14 as shown in FIGS. 4 and 5. Here, an elevating structure can be placed under the dynamic surface element 10 at one or more locations as desired. For example, an elevating strip 42 may be secured to the lower wall 16 between edges 18 and 20. The elevating strip 42 is provided on its bottom surface with a peel-and-stick adhesive 38, as previously described, to effect attachment of the element 10 to body 14. The elevating strip 42 creates air pathway(s) 44 (FIG. 5) between the lower wall 16 and the surface 12. Tests have shown that reverse flow C traveling through the pathway(s) 44 acts against any rearward flow B and allows for a stronger forward flow offsetting the drag at the forward edge of the element 10. This elevation technique thus further improves the efficiency of the dynamic surface element 10.

FIGS. 6–10 show another type of dynamic element 10' which is similar to that described in FIGS. 1–3 except for a more elongated, lower profile. Specifically, the lower wall 16' is lengthened and has a generally rectangular shape. The front edge 18' does not extend beyond lower edge 24' of upper wall 22'. Here, upper wall 22' rises vertically and then curves gradually upwardly and proceeds continuously rearwardly substantially for the length of the lower wall 16'. Dynamic surface element 10' operates in the same manner as previously described except that the different shape is utilized when a downward or inward force on the body 14 is tolerable or beneficial. FIG. 9 illustrates an element 10" which does not require an inner wall 36'. The dynamic elements 10' and 10" may also include one or more elevating strips 42 if desired. In FIG. 10, the rear surface of inner wall 36' of element 10' is provided with a post pressurizing material 46. Post pressurizing material 46 is described in copending U.S. patent application Ser. No. 11/005,056 filed Dec. 6, 2004 herein incorporated by reference. The post pressurizing material 46 is a collection of dense flexible fibers which trap reverse airflow C and help accumulate pressure therein so as to help propel the body 14 forward.

Testing has demonstrated that use of the dynamic element, by itself, reduces drag significantly and results in greater fuel savings on vehicles with an increase in vehicle velocity.

The shape, scale, location, spacing and aesthetics of the elements will be varied to optimally serve a given situation depending upon factors such as the velocity of the vehicle, velocity and density of the fluid medium, strength needed, weather environment and area to be served. For example, widely spaced dynamic surface elements could be extremely effective in situations involving large body areas moving at high velocities. It may not be necessary to have intense substantially continuous coverage. Although the invention has been described relative to bodies moving through air, it should be understood that the dynamic surface elements can also be used in other fluid mediums such as water and on other vehicles besides land vehicles.

It should be appreciated that the shape and slope of the upper wall 22 of the element 10 will determine whether, besides forward push, it will also provide an upward lift or downward pressure. In the embodiment of FIGS. 1–5, the upper wall 22 is shaped so as to enable a lift away from the surface of the body 14. In the embodiment of FIGS. 6–10, the upper wall 22 is profiled so as to provide a force downwardly against the body 14.

The present invention is predicated upon minimizing the adverse fluid flow upon a surface and systematically converting the adverse flow to a propulsive force while simultaneously preventing the adhesive and cohesive buildup of fluid layers that normally create drag. The dynamic surface element embodying the invention permits the conversion from smooth, drag-generating surfaces to efficient and dynamic surfaces by modifying the body or vehicle on which it is mounted rather than by tearing down and rebuilding the body or vehicle. The dynamic surface element may be attached, integrated or otherwise located on the surface of the body. Each dynamic surface element operates independently decreasing drag and reversing and capturing flow in its own area to assist movement of the body with enhanced results in fuel efficiency and increased velocity previously unattainable.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. A dynamic surface element located on a substantially smooth surface of a body moving through a fluid for improving the movement of the body, the dynamic surface element comprising:

a lower wall provided on the surface of the body, the lower wall having a front edge extending rearwardly to a back edge;

an upper wall rising upwardly and rearwardly from the lower wall, the upper wall having a lower edge connected to the lower wall, and an upper edge spaced above the lower wall; and a pair of sidewalls connecting the upper and lower walls and forming with the upper and lower walls a chamber accumulating internal pressure offset by external pressure caused by fluid flow against and over the upper wall as the body moves, whereby the dynamic surface element interrupts layers of fluid normally accumulating on the smooth surface of the body moving through the fluid and creating drag, a major portion of the fluid flowing over and rearward of the upper wall being reversed and captured due to internal and external pressure differential of the chamber to reduce drag and simultaneously act against rear surfaces of the dynamic surface element to define a propulsive force assisting movement of the body.

2. The dynamic surface element of claim 1, including elevating structure for raising the lower wall above the surface of the body.

3. The dynamic surface element of claim 1, including an inner wall extending between the upper wall and the lower wall, the inner wall providing a reaction surface against which the reverse fluid flow acts, and forming a barrier for preventing excess water and dirt from accumulating in the chamber.

4. The dynamic surface element of claim 1, wherein the lower wall is attached to the body by a peel-and-stick adhesive.

5. The dynamic surface element of claim 1, wherein the upper wall extends upwardly and rearwardly at various slopes.

6. The dynamic surface element of claim 3, wherein the inner wall is provided with a post pressurizing material on a rear surface thereof.

* * * * *